(12) United States Patent
Henry et al.

(10) Patent No.: US 11,349,843 B2
(45) Date of Patent: May 31, 2022

(54) SYSTEMS, METHODS AND APPARATUSES FOR INTEGRATING A SERVICE APPLICATION WITHIN AN EXISTING APPLICATION

(71) Applicant: EDUTECHNOLOGIC, LLC, Columbus, OH (US)

(72) Inventors: Brad Henry, Columbus, OH (US); Howell Dalton McCullough, IV, Dublin, OH (US)

(73) Assignee: EDUTECHNOLOGIC, LLC, Columbus, OH (US)

( * ) Notice: Subject to any disclaimer, the term of this patent is extended or adjusted under 35 U.S.C. 154(b) by 275 days.

(21) Appl. No.: 16/595,200

(22) Filed: Oct. 7, 2019

(65) Prior Publication Data

US 2020/0112566 A1 Apr. 9, 2020

Related U.S. Application Data

(60) Provisional application No. 62/741,960, filed on Oct. 5, 2018.

(51) Int. Cl.
| | |
|---|---|
| G06F 16/27 | (2019.01) |
| H04L 9/40 | (2022.01) |
| G06F 9/451 | (2018.01) |
| G06F 3/04815 | (2022.01) |
| G06F 3/0482 | (2013.01) |

(Continued)

(52) U.S. Cl.
CPC .......... *H04L 63/102* (2013.01); *G06F 3/0482* (2013.01); *G06F 3/04815* (2013.01); *G06F 3/04845* (2013.01); *G06F 9/453* (2018.02); *G06F 16/27* (2019.01); *G06F 40/30* (2020.01); *G06V 10/10* (2022.01); *G10L 13/027* (2013.01); *H04L 63/08* (2013.01); *G06F 40/186* (2020.01); *G06F 2203/04806* (2013.01); *G06V 30/10* (2022.01)

(58) Field of Classification Search
None
See application file for complete search history.

(56) References Cited

U.S. PATENT DOCUMENTS

10,410,542 B1 * 9/2019 Stone ................... G09B 23/285
10,824,310 B2 * 11/2020 Acharya ................. G06F 9/453
(Continued)

*Primary Examiner* — Howard Cortes
(74) *Attorney, Agent, or Firm* — Benesch, Friedlander, Coplan & Aronoff LLP (57) ABSTRACT

Systems, methods, devices for extending capabilities of an existing application to augment learning of a device in training are disclosed. The method includes: creating on a user device, an authorized session for running a local service application on the user device within an environment of an existing application which runs on a system remote from the user device; displaying a home screen menu which is personalized for a user, selection options to launch the local service application to execute within the existing application to provide extended functionalities to the existing application to augment learning of a device in training, wherein the selection options enable the user device to perform one or more task on the another device, include: resuming activities of a recent task previously performed, updating user's credentials through the training or learning, and starting a new task on the device in training or on another new device.

20 Claims, 10 Drawing Sheets (51) Int. Cl.
*G10L 13/027* (2013.01)
*G06F 3/04845* (2022.01)
*G06F 40/30* (2020.01)
*G06V 10/10* (2022.01)
G06F 40/186 (2020.01)
G06V 30/10 (2022.01)

(56) References Cited

U.S. PATENT DOCUMENTS

| | | | |
|---|---|---|---|
| 10,917,587 B2* | 2/2021 | Hansbrough | H04N 5/272 |
| 2010/0208033 A1* | 8/2010 | Edge | H04N 13/221 |
| | | | 348/46 |
| 2013/0125029 A1* | 5/2013 | Miller | G06F 9/45529 |
| | | | 715/760 |
| 2015/0185825 A1* | 7/2015 | Mullins | G06F 3/048 |
| | | | 345/633 |
| 2015/0206440 A1* | 7/2015 | Aylesworth | G09B 7/04 |
| | | | 434/362 |
| 2016/0027216 A1* | 1/2016 | da Veiga | G06F 3/0484 |
| | | | 345/419 |
| 2017/0060379 A1* | 3/2017 | Capozella | G06F 3/04815 |
| 2017/0097948 A1* | 4/2017 | Kerr | G06F 3/04842 |
| 2018/0033210 A1* | 2/2018 | Vats | G06F 3/017 |
| 2018/0131907 A1* | 5/2018 | Schmirler | G05B 23/0216 |
| 2018/0165984 A1* | 6/2018 | Waldron | G09B 5/02 |
| 2018/0181810 A1* | 6/2018 | Jhawar | G06F 3/0482 |
| 2019/0121168 A1* | 4/2019 | Greget | G02B 27/0172 |
| 2019/0347783 A1* | 11/2019 | Salgian | G02B 27/017 |
| 2020/0112557 A1* | 4/2020 | McCullough, IV | H04L 63/083 |
| 2020/0160739 A1* | 5/2020 | Smith | G09B 19/00 |

\* cited by examiner

SYSTEMS, METHODS AND APPARATUSES FOR INTEGRATING A SERVICE APPLICATION WITHIN AN EXISTING APPLICATION

CROSS-REFERENCE TO RELATED APPLICATIONS/INCORPORATION BY REFERENCE

This disclosure claims priority to and the benefit from U.S. Provisional Patent Application Ser. No. 62/741,960 titled "Industrial Badger Application and Uses Thereof", filed on Oct. 5, 2018, which is herein incorporated by reference in its entirety.

TECHNICAL FIELD

This disclosure generally relates to systems, methods, devices, and/or products (referred to herein as "systems and methods") for integrating and implementing a service application within an existing applications to extend the capability of the existing application in a process and/or system. Such service application may be implemented in wearable and mobile devices.

BACKGROUND

Learning trend steers towards self-guided instructions with minimal personal assistance. It remains an on-going challenge to design an intuitive and user-friendly tool to assist self-guided learning. As learning becomes more personalized, there is an increasing need to protect user's identity and to secure user's access to web services without being breached.

DESCRIPTION

To facilitate understanding, various elements with out-of-sequence reference designations may be referred to corresponding drawings in the disclosure.

Systems, methods, devices, and/or products (referred to herein as "systems and methods") are described herein for integrating existing applications within a process and/or system as a micro-service and extending their capability with intelligent applications for wearable and mobile devices.

In some examples, the systems described herein may include (or correspond to) an Industrial Badger Application® (IBA), an integrated mixed reality content management system (IMR-CMS) (e.g., an IMR-CMS API), and/or an integrated mixed reality web client (e.g., an IMR-CMS client). The IBA may correspond to a tool that may be utilized within an existing environment by integrating existing applications within a process and/or system as a micro-service and extending their capability with intelligent applications for wearable and mobile devices. As such, the IBA may be integrated within the process and/or system to extend existing services by offloading the complexity of delivering information by providing technological solutions that simplify the experience for the user.

Figure 1:
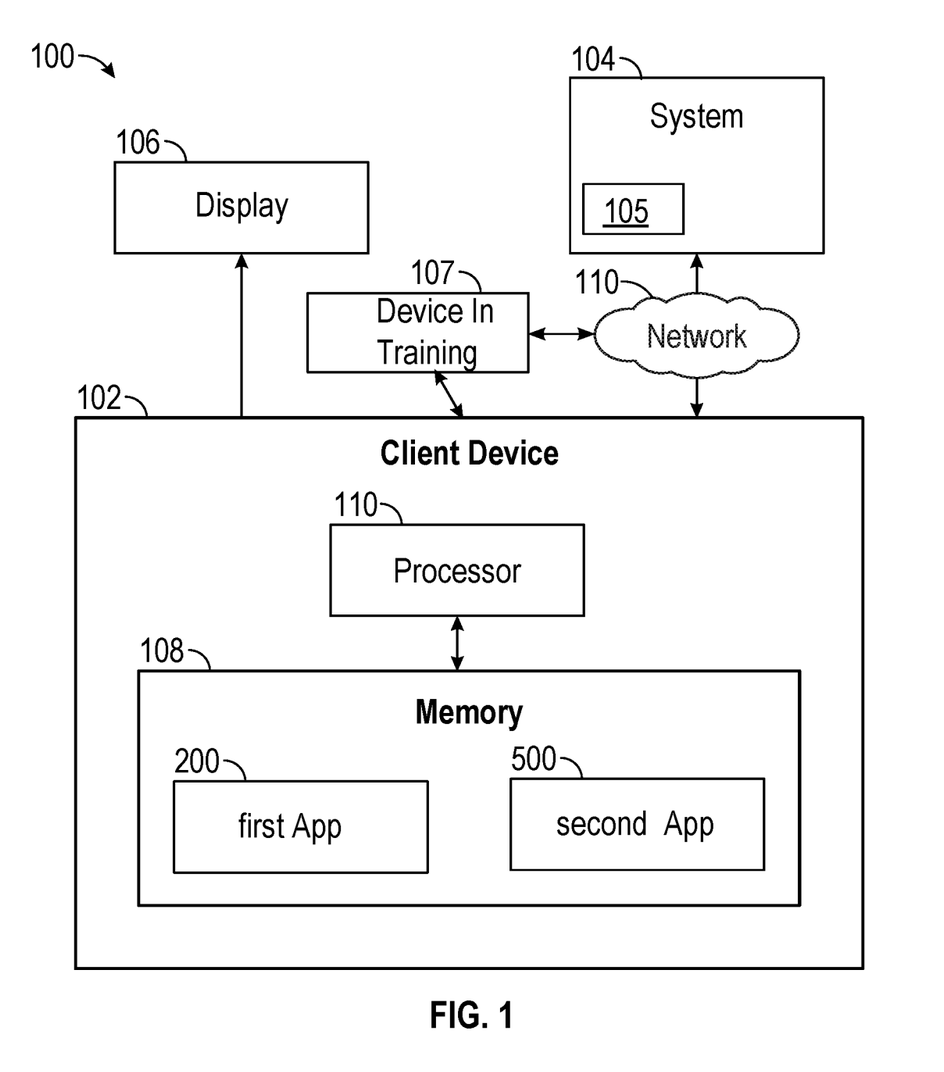
FIG. 1 illustrates an exemplary environment that includes a tool or a user device interacting with a system.

FIG. 1 illustrates an exemplary environment 100 that includes a tool or a user device 102. In some examples, the tool or user device 102 may include a processor 110 and a non-transitory computer storage medium, such as volatile memory (for example, but not limited to, random access memory), non-volatile memory 108 (for example, but not limited to, a hard disk drive, a solid-state drive, flash memory, or the like), or a combination thereof. The memory 108 may stores program codes of at least a first local service application 200 and a second local service application 500. In an example, the first local service application 200 may interact with an existing application 105 in a remote system 104 to extend capabilities of the existing application 104 to augment learning of a device in training 107 (such as an onsite equipment or an instrument). In another example, the second local service application 500 may operate in conjunction with the first service application 200 to provide identity access management to access web services through the network 110.

In an example, the first local service application 200 may correspond to the industrial badger application (IBA) as described herein as an example. In some examples, the tool may be implemented on a user device 102. The user device 102 may include, but not limited to, a portable device such as a laptop, a tablet, a cellular device (e.g., smart phone client 404 in FIG. 3), a personal digital assistant (PDA), a server, a wearable device (e.g., RealWear HMT-1), a smart-watch, a non-portable device such as a desktop computer, a special purpose computer, and the like. In some examples, the tool or user device 102 may be configured to communicate with one or more other devices in training 107 and/or remote systems 104 over one of a wireless, a wired network 110, and a combination thereof. In an example, the tool or user device 102 may be configured to communicate with the remote system 104. The remote system 104, in some examples, may correspond to a system, as described herein. The tool or user device 102 may be configured to generate display information for rendering on a display 106.

In some examples, the tool or user device 102 may be configured to display one or more user screens on the display 106. The one or more user screens (display 106) may include, but not limited to, one of a splash screen 210 in FIG. 2A (e.g., for displaying a logo, for example, a company logo, etc.), a home screen 220 in FIG. 2A (e.g., for providing main application navigation, a badger-bot, etc.), a content screen 260 in FIG. 2C (e.g., for querying and displaying content from the IMR, etc.), a notes screen 240 in FIG. 2C (e.g., for allowing users to view and save notes, to create and edit notes, attach images to notes, etc.), a gallery screen 250 in FIG. 2C (e.g., for viewing images that have been captured by the tool, etc.), a chat-bot screen (e.g., for interaction with the user, retrieving message history, etc.), and a combination thereof. In some examples, the tool or user device 102 may include a standard mobile application view. This view may be used for a traditional application user, which may struggle with newer, complex sets of interactions, or does not require an augmented-reality (AR) view.

In some examples, the tool or user device 102 may include a biometric authentication system with a blockchain verification system 460 (see FIG. 3) that may be configured to protect the user's information and provides tracking of user information. In an example, the tool or user device 102 may include a badger-bot 511 (see FIG. 4A). The badger-bot 511 may be configured to integrate a virtual agent/search engine with International Business Machines (IBM®) discovery services. The badger-bot 511 may be used to assist users with navigation of the tool or user device 102 and guide a user to offline content, such as documents, content, workflow services.

Figure 3:
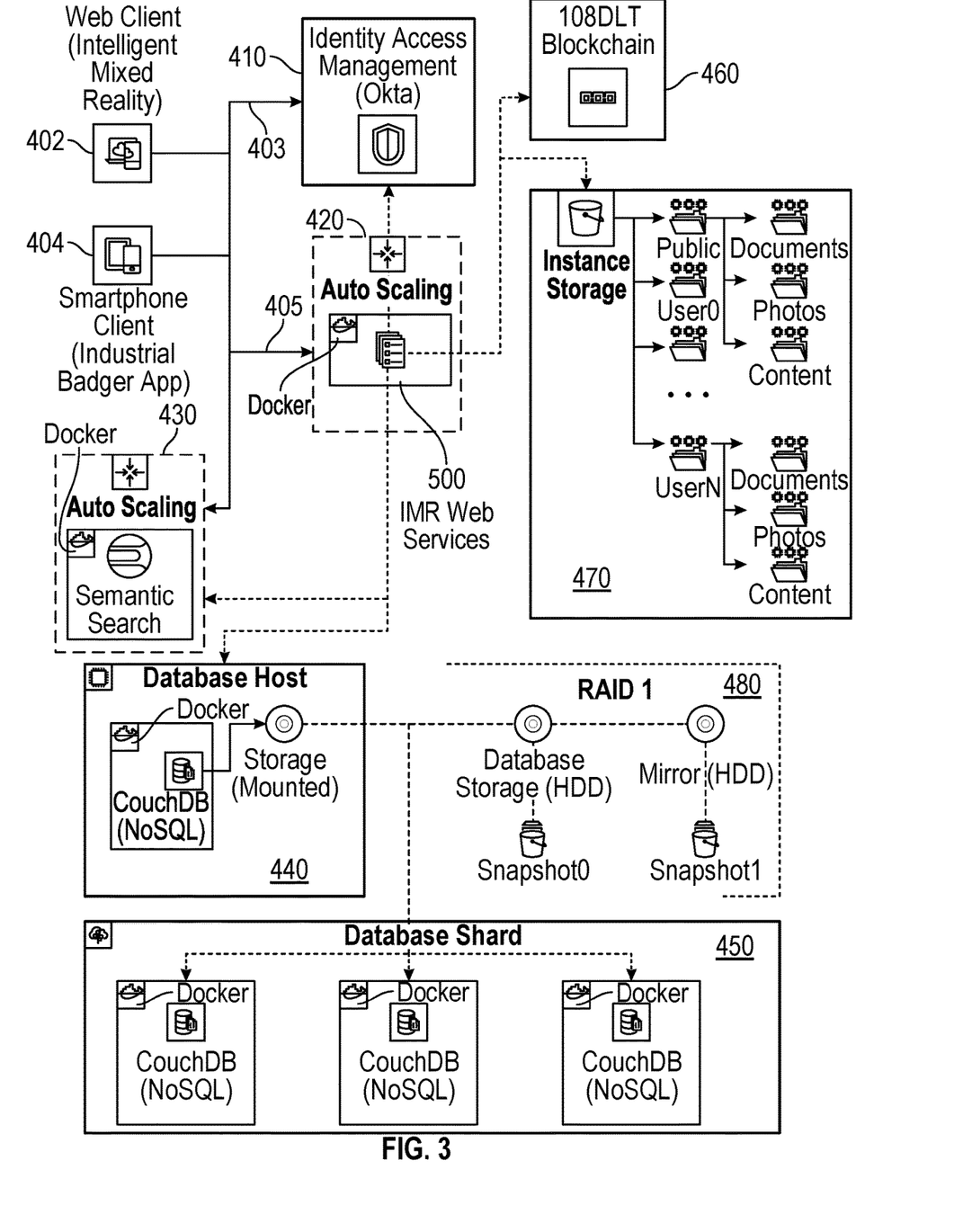
FIG. 3 illustrates a second local service application interacting with the first local service application to provide identity access management of the user device in FIG. 1.

In some examples, the tool or user device 102 may be integrated with the IMR-CMS in the web client 402 or smartphone client 404 in FIG. 3. The IMR-CMS allows for application content development system, synchronous integration for online and offline delivery to tool, mapping, document storage. Application data for content, multiple topics, maps, SSO integration, may be used to data mine information and deliver information to the user. In some examples, the tool or user device 102 may be integrated with a plurality of different external document repositories (database 531, 533 in FIG. 4B). This document services integration may allow the user to search and call information that may be localized and accessible once called. The user may have the ability to refine search results by document, image, and other types.

In some examples, the IBA® 200 may be managed by the Intelligent Mixed Reality System (IMR) Content Management System (CMS). IMR may be hosted on a remote server (e.g., a MICROSOFT® Azure server) to allow for a secure environment and integration with Active Directory and other Federated Services. The Content Management System (CMS) may provide a given user an editor for content that may be controlled by IBA® Content that may be called and localized for the user's request. In some examples, the Intelligent Mixed Reality System (IMR) may include a quiz engine that may be configured for testing users (such as training a user to learn a piece of equipment or a machinery). In some examples, the IMR may include a micro-service integration. The micro-service integration may permit an entity (e.g., an owner user or a user group) to add and remove access to embedded applications within the custom IBA®.

In some examples, the tool or user device 102 may include an augmented-reality (AR) viewer 280. In an example, the augmented-reality (AR) viewer may correspond to an autonomous viewer. The autonomous viewer may allow the tool or user device 102 to call a supported viewer. In some examples, the AR viewer 280 may be a Vuforia Studio®. The AR viewer 280 may be configured to integrate IMR content 2, video 254, Notes 242-246, Image Gallery, Image & Video Capture 251-254. AR applications may be swapped out of this view for integration for tools such as, ThingWorx®, ARCore®, Unity3D®, WikiTude®, ARKit®, etc. In some examples, the AR viewer 280 may be configured to align content when objects are recognized, information, such as video and text information is stored and localized and controlled by the user. The user may capture notes, images and record videos on demand.

In some examples, the tool or user device 102 may be integrated with accessibility options that may include, but not limited to, a hands free option for a device (e.g., the RealWear® HMT), optical character recognition (OCR) text and handwriting recognition, and markup language included for visually impaired users to navigate the tool or user device 102. Additional integration may include, but not limited to, object recognition included with the OCR viewer (e.g., OCR reader module 270), OCR document loader to read the text and user controlled views of the content viewer that allow for up to 300× magnification of content.

Figure 4A:
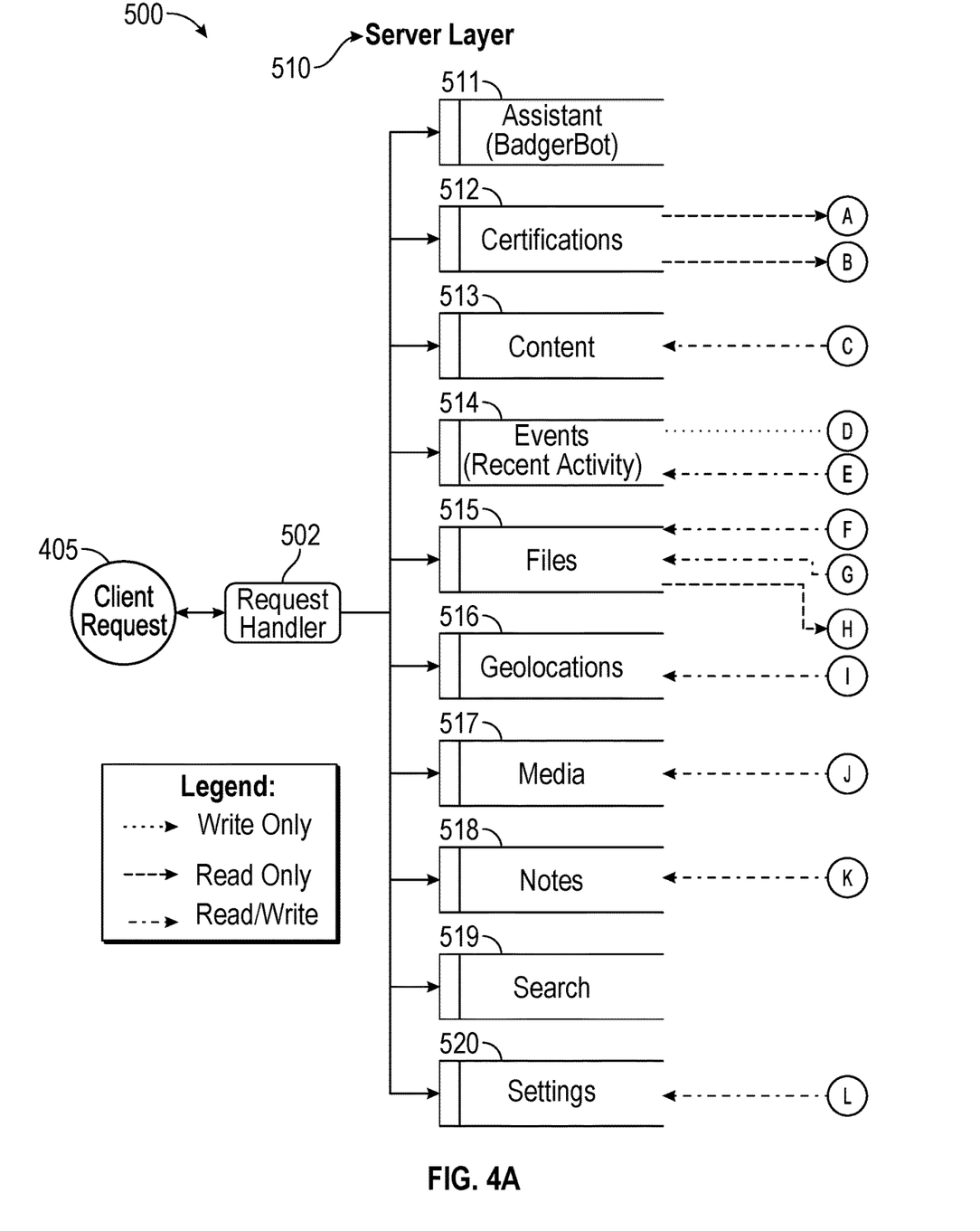
FIGS. 4A to 4D illustrate the second local service application interacting with the first local service application to access web services in the user device.
Figure 4B:
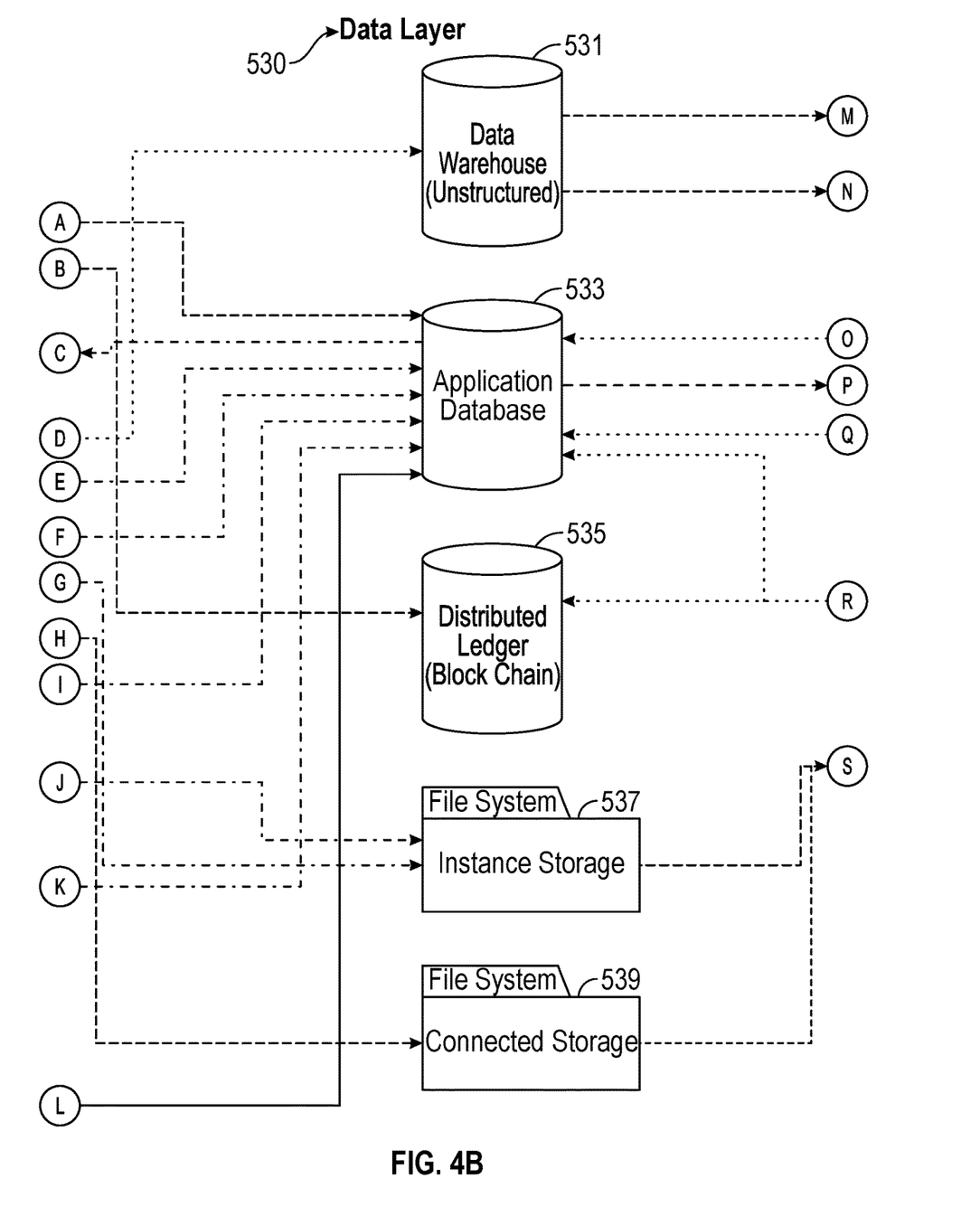
Figure 4C:
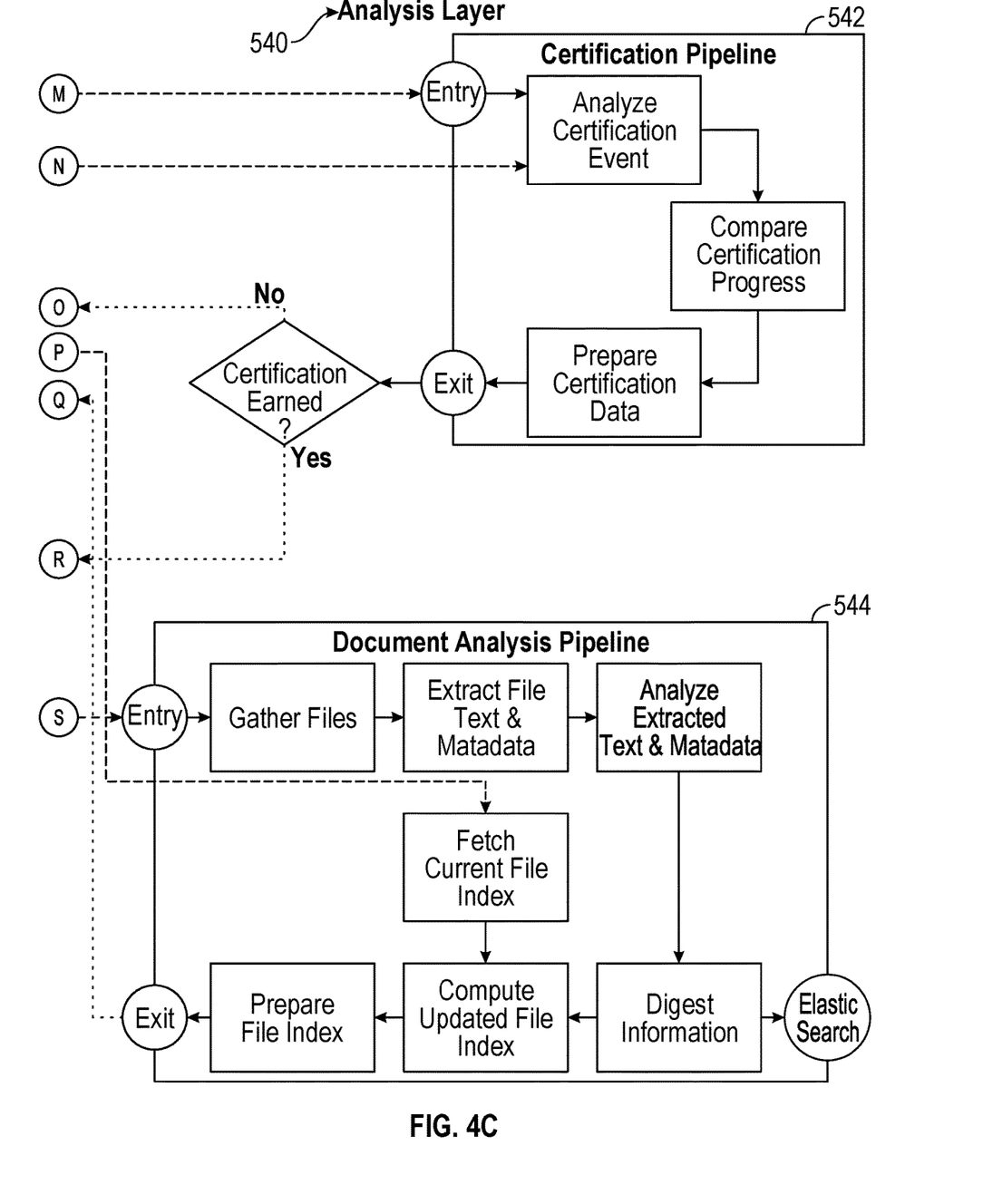
Figure 4D:
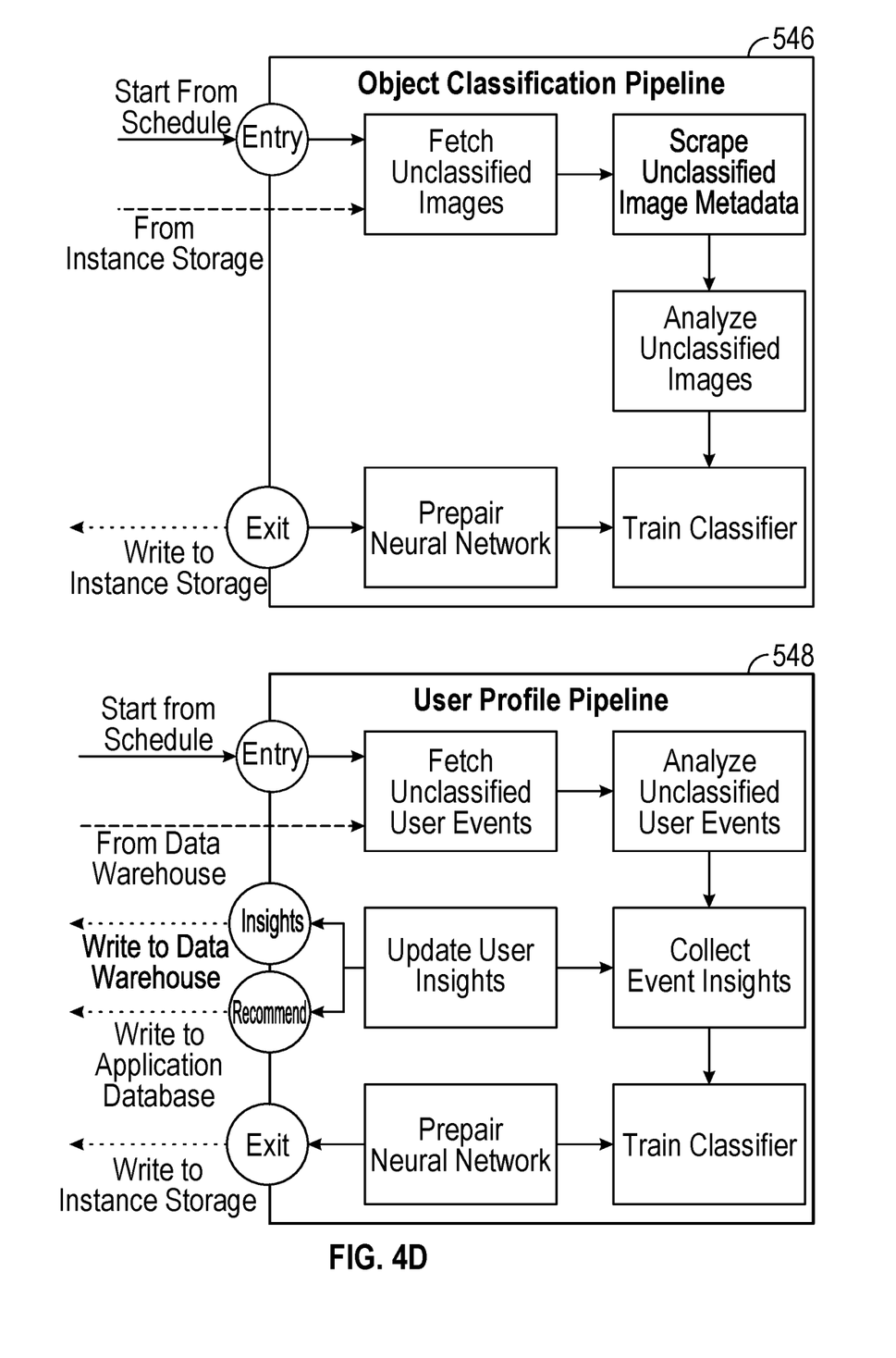

In some examples, the badger-bot 511 in FIG. 4A may be used to assist users with navigation of the tool or user device 102 and guide the user to offline content. The offline content may be localized and available offline to support users who may be working in extreme conditions. In an example, the offline content does not include instances where a connection is necessary, such as discovery search and AR interactions. Additionally, or alternatively, the tool or user device 102 may include Watson Discovery integration. In some examples, the tool or user device 102 may include PowerAI® integration and/or support services, custom services, data mining for measuring users, predictive analysis, and/or smart feeds. In an example, the tool or user device 102 may integrate with an Azure File server and Blob Storage®, Box®, and Drive®.

Additionally, or alternatively, in some examples, the tool or user device 102 may be integrated with IBM Cognitive services for Chat and Virtual Agent® with integration into Watson Discovery Services®. In some examples, the tool or user device 102 may be integrated with Google Cloud Speech®. In an example, the tool or user device 102 may be configured with speech to text functionality. The tool or user device 102 may be configured with a note taking feature that may integrate with NLP and Image Gallery and provide for export functions. As such, user captured notes may be stored, for example, in the IMR, or may be pushed and shared with other users. In some examples, the tool or user device 102 may be configured with a search functionality. The search may include a localization offline search and external search with integration with Discovery and external document repositories. In some examples, the tool 102 may provide for image capturing, drawing, user-controlled AR interface, API integration, cognitive services, encryption services, object retrieval services, training delivery services, discovery services, markless tracking, user authentication, task tracking, geolocation, barcode scanning, OCR, remote mentor services, offline speech services, fisheye zoom functionality, export functionality, and quiz services.

FIGS. 2A to 2D illustrates a method of extending capabilities of an existing application 105 to augment learning of the device in training 107. In an example, the device in training 107 may be a piece of on-site machinery such as a computer numerical controlled (CNC) machine, a biomedical device, a robotic, an electronic equipment, or a controller used to train a user to learn to remotely control an offsite device such as an unmanned vehicle. The method of extending capabilities of the existing application 105 may include the steps of: creating on a user device 102, an authorized session for running a first local service application 200 on the user device 102 within an environment of an existing application 105 which runs on a system 104 remote from the user device 102, displaying on the user device 102, a home screen menu 220 which is personalized for a user, with selection options (222, 224, 226) to launch the first local service application 200 to execute within the existing application 105 to provide extended functionalities to the existing application to augment learning of the device in training 107, wherein the selection options enable the user device to perform one or more tasks on the another device 107, for example: resuming activities of a recent task previously performed (option 222), updating user's credentials through the training or learning (option 224), and starting a new task on the device in training or on another new device (option 226).

Figure 2A:
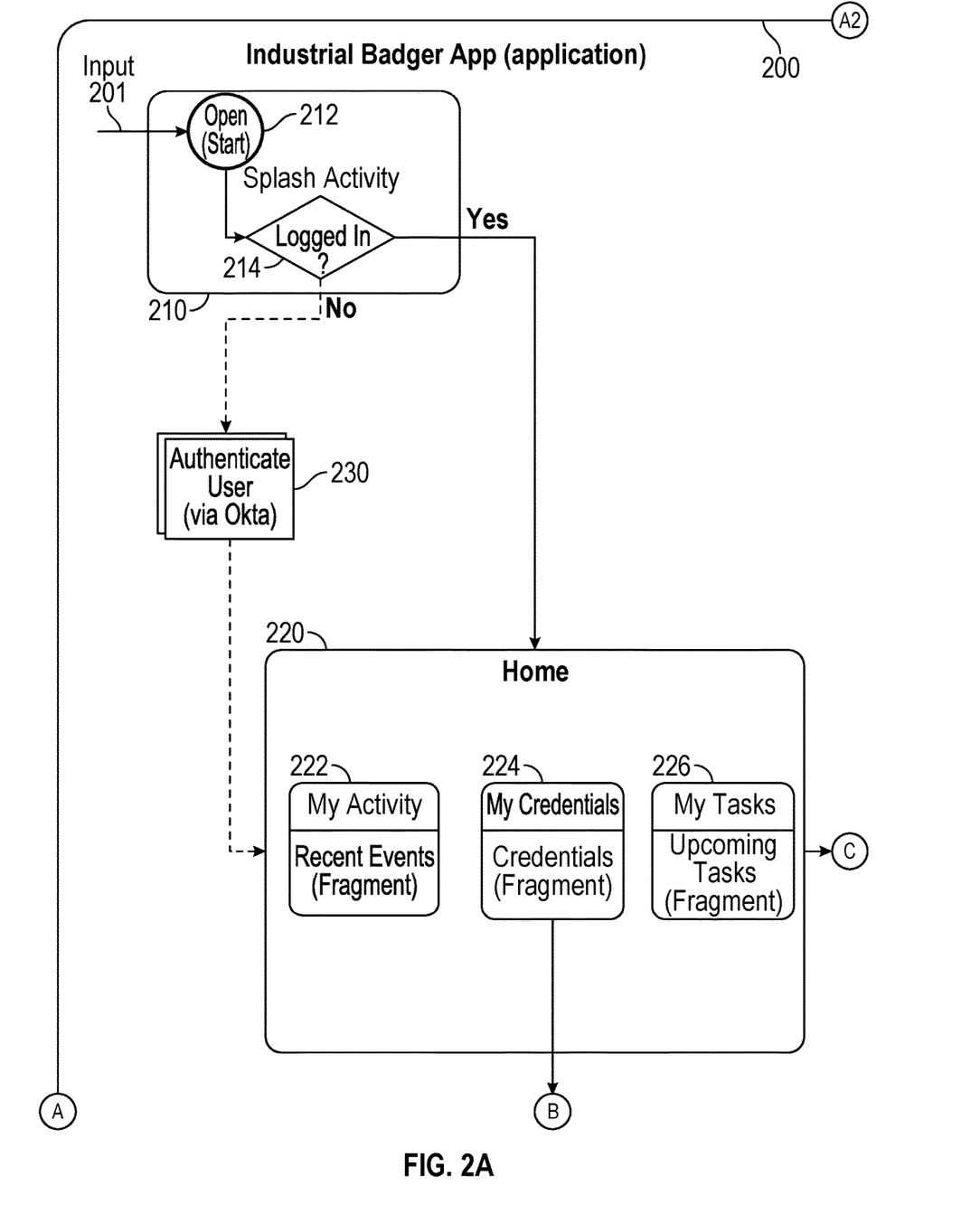
FIGS. 2A to 2D illustrate a method of extending capabilities of an existing application to augment learning of a device in training.
Figure 2B:
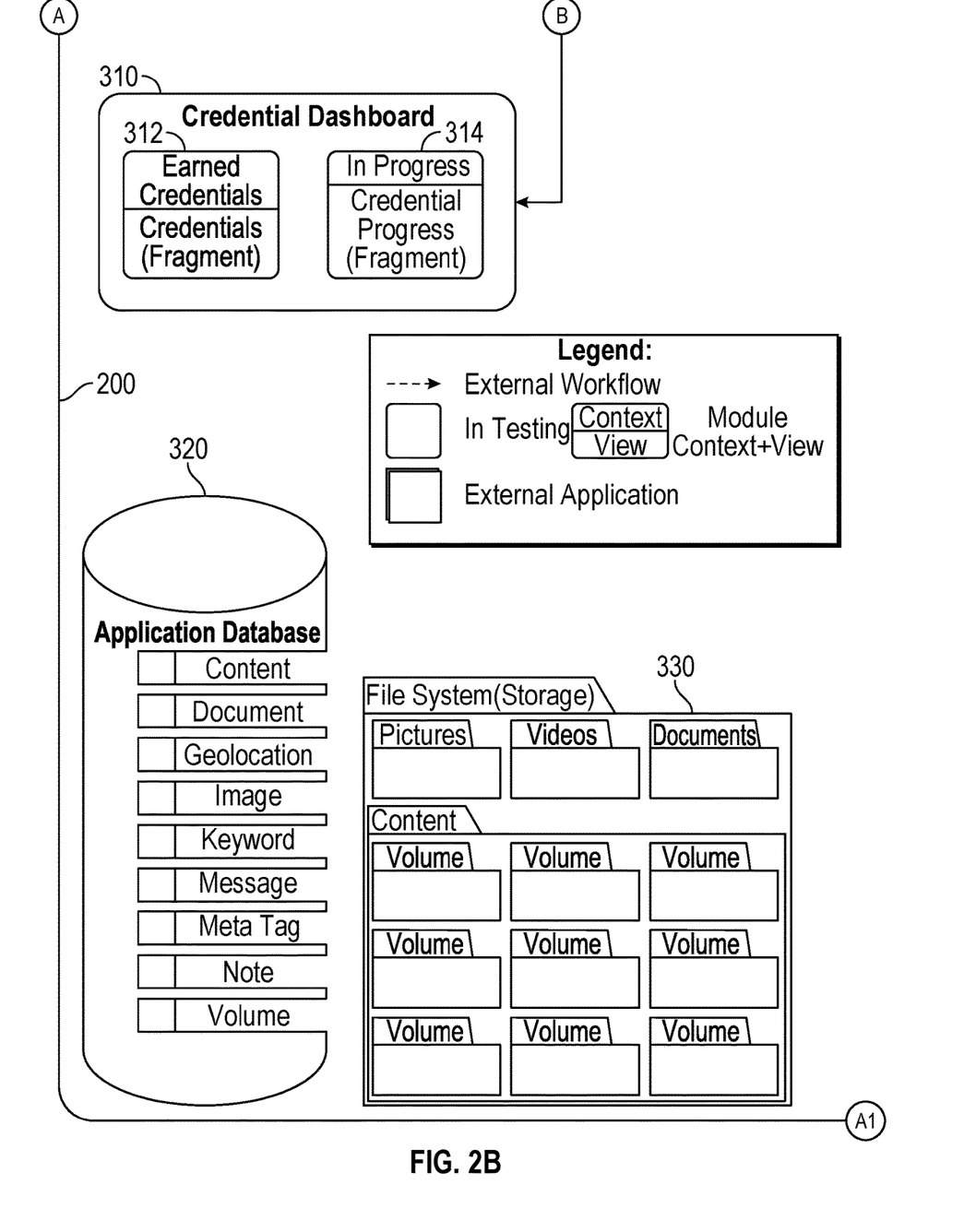

In operation, the user may open the first local service application 200 (hereinafter also may be referred to Industrial Badger App® (IBA)) to check to see if the user has been logged in 214. If the user has not been logged in, the user may be prompted to a login screen 210 to be authenticated 230 by an Identity Access Management (IAM) which may be provided by a third party application such as OKTA®, which integrates with any OAuth2 identity provider (such as GOOGLE®, Active Directory, AWS IAM, etc.)

Afterwards, the user may be presented with a home screen 220 detailing personalizable information about their usage within the first local service application 200. The user may also be presented with a non-obtrusive collapsing menu, allowing them to navigate to the subcomponents (such as option 222, 224, 226) within the first local service application 200:

a. The user may be presented with the following personalizable information:

i. Option 222: user's recent activity within the first local service application 200, e.g.: last accessed content "HC10 w/wo DT: YRC1000 Controller"

ii. Option 224: user's latest earned credentials/microcredentials. The user may enter the Credential Dashboard 310 for a detailed view on their credentials/micro-credentials.

iii. Option 226: user's next upcoming tasks. The user may be presented with the navigation destinations on respective screens, including: Notes 240, Gallery 250, Content 260, Reader OCR 270, Viewer (Augmented Reality Viewer) 280, Camera 280, Task 300.

Figure 2C:
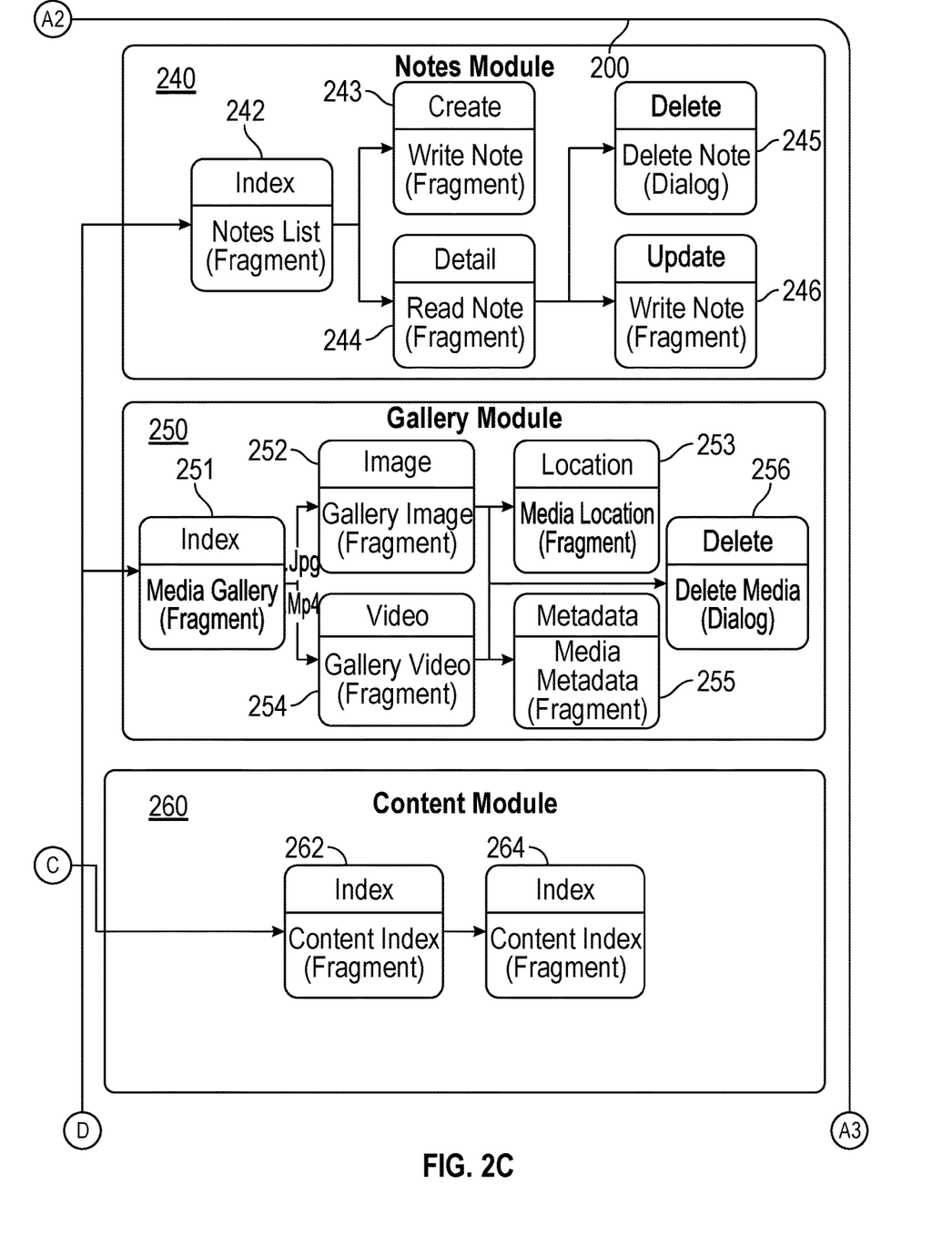
Figure 2D:
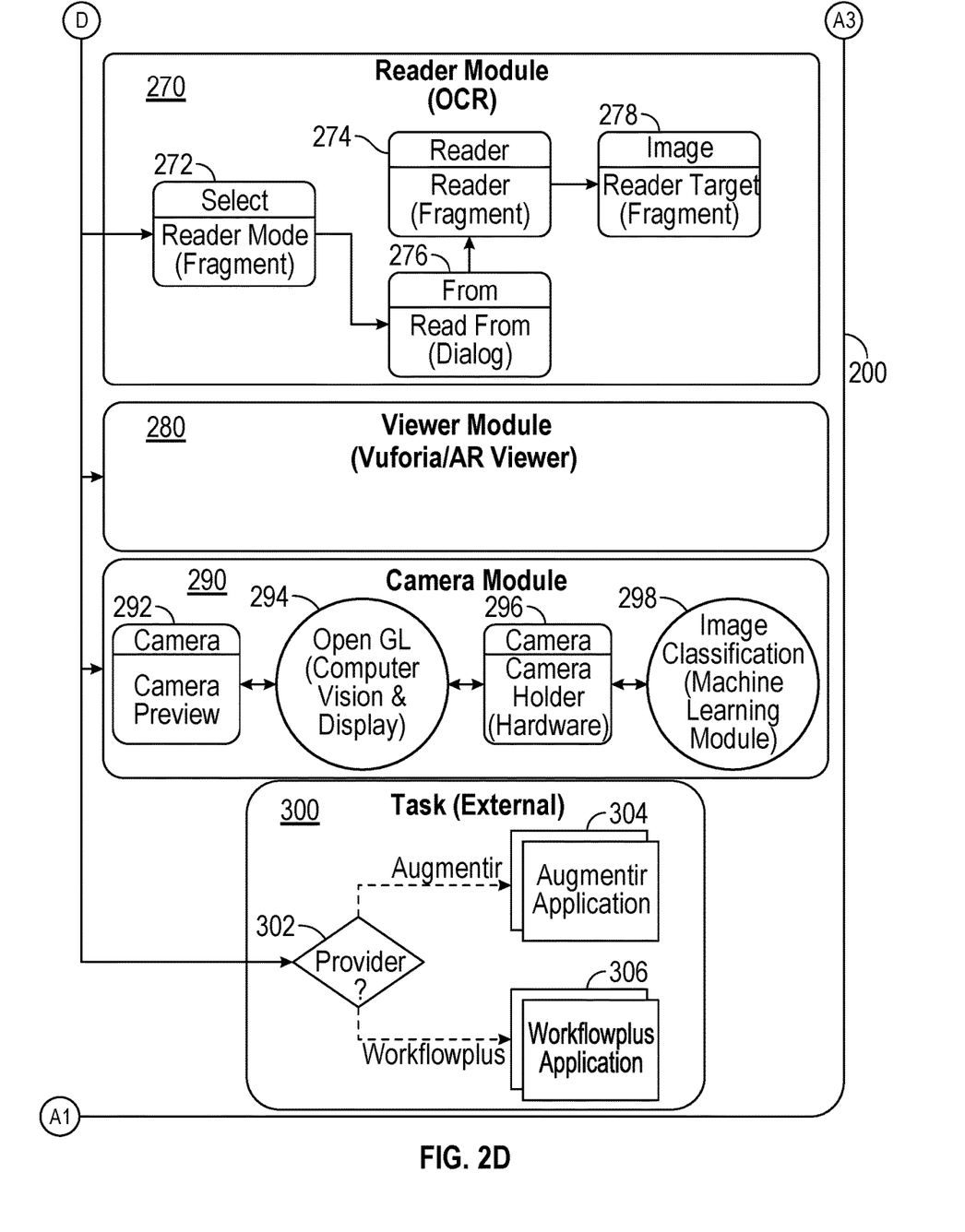

In operation, the Notes module (see Notes screen 240) houses all components 242-246 related to reading, writing, and deleting notes, defined as a title, body, and optional collections of images, videos, and geolocations. Upon entering the Notes screen, the user may be presented with a list of notes they have taken while using the first local service application 200 (i.e., IBA). The user may open a note, perform a search through their notes, or create a note from this screen. The user may be presented with an empty template to create a note. The user may enter the title, body, and attach images/videos from device storage, or from a device camera. The user may additionally use the onboard device GPS to attach their current location to the note. The user may also view any of the attached images, videos, or geolocations (See Gallery module description) for actions the user may take while viewing an image. The user may be presented with a read-only note they have previously written. From this screen 240, the users may have the option to either update or delete the note. The user may also view any of the attached images, videos, or geolocations. The user may also be presented with an editable version of a note they have previously written. The user may modify the title, body, and update the collections of images, videos, and geolocations.

In operation, the Gallery module (see Gallery screen 250) houses all components 251-256 related to viewing and deleting any media captures while using the first local service application 200 (i.e., IBA® or the app). Upon entering the Gallery screen 250, the user may be presented with a list of images and videos they have captured. The user may select an image or video to view it. While viewing a media item (image or video) the user may view location data attached to the item, view/modify metadata (predefined & custom user tagging) attached to the item, or delete the item from the device completely. Viewing the item's location data may provide the user with a map. A location marker may be placed on the map based on the provided latitude and longitude from the location data. Viewing the item's metadata may provide the user with an editable list of tags attached to the image. The user may view/modify raw EXIF (Exchangeable Image File Format) data from the image (often set by the device camera), and view/modify custom tags from the image (as defined by the user).

In operation, the Content module (see Content screen 260) may be one of the main features of the first local service application 200 (i.e., IBA or the app), and houses all components 262, 264 related to viewing "content". Upon entering the Content screen 260, the user may be presented with a list of "content" collections (Volumes). A user may toggle a collection to see a list of pages (Content) that make up the Volume. The use may select the Volume to begin reading from the first page or select a page to begin reading that Volume from that page. The user may also search through content or re-sync their data with the server. The user may toggle the view between all content and training-only content. The user may be presented with a content viewer that changes behavior based on the type of that content (see Appendix, 1). The user may swipe left/right to view different pages of content. The user may increase/decrease a zoom factor (between 1× and 10× magnification) to make the content easier to read. The user may be provided with a non-obtrusive action menu. Using the actions prescribed by the menu, the user may increase/decrease zoom factor by one step, invert the color of the content, or enable/disable scrolling by device tracking. The user may additionally save the current Content page, or the complete Volume allowing them to view the object while offline (disconnected from a network).

In operation, the Reader module (see OCR Reader screen 270) houses all components 272-278 related to "reading" text. "Reading" text may be performed by using an Optical Character Recognition (OCR) engine, which extracts text from a provided image or file. The extracted text is then used by a Text-to-Speech (TTS) engine to vocalize the text to the user. Upon entering the Reader screen 270, the user may be presented with two options for OCR mode: (a) Read text using a simple (faster) text extraction model, (b) Read text using a more complex (slower, with more robust results) handwriting & text extraction model.

Upon selecting OCR mode, the user is presented with a dialog to choose the image or file they would like to be read aloud. Upon selecting the image or file the user may like to be read aloud, the OCR engine may begin to process and extract text from the subject. While the engine is running, the user may be presented with text letting them know that the task has been enqueued and is running. Upon completion, the user may be presented with a webpage generated from the extracted text. The TTS engine may also begin to read the text aloud to the user. The user may toggle back and forth between the extracted text and a view of the source file used by the engine. The user is provided with a non-obtrusive action menu. Using the actions prescribed by the menu, the user may increase/decrease zoom factor by one step, invert the color of the view, play/pause/stop the TTS engine from speaking, or increase/decrease engine speech rate.

In operation, the Camera module (see Camera screen 290) uses the several device hardware components to provide a camera implementation to the user. The camera may be used to both take pictures and capture video. The camera preview may be the primary view that the user may see. The user may be presented with the ability to capture an image/video, zoom in/out in the preview, and freeze the preview. The user may also be presented with a non-obtrusive action menu.

The user may use the menu to augment the camera using a renderer. When the renderer is enabled, the preview may be: (a) transformed using computer vision effects to help facilitate readability of the screen, (b) augmented to render a 3D model for reference, (c) fed to an image classifier to help the user locate items in their 3D space.

In operation, the Tasks module (see Task screen 300) facilitates entry into a workflow provider application. The workflow provider may detail a list of tasks and/or workflows for the user to complete. Its integration into the first local service application 200 (or the IBA®) may allow the user to seamlessly flip back and forth between workflow and the first local service application 200 (or the IBA®), so the user may use information from the first local service application 200 (or the IBA®) to walk through/complete tasks from the workflow provider.

In another operation, the Viewer module (see Viewer Screen 280) may tie together all the previously defined modules (Notes, Gallery, Content, Camera, Tasks) into a single location, and may use an Augmented Reality Viewer (Viewer) to provide cognitive vision-based services. In addition to all of the features described in the separate modules, the Viewer module may compliment and extend the functionality of the existing application 105 in the remote system 104, by providing: (a) Image Target Recognition; a service in which the camera feed used by the Augmented Reality engine on the user device 102 may be fed to an image classification model to recognize and locate potential objects. The user may be alerted when the engine has recognized any potential objects; (b) Model Target Recognition; a service in which the user may specify an object that they are looking for. The user may select a view from a list of views of the object (from the object as a whole to a smaller component of the object). The view may then be displayed on the screen 270, and the user will be alerted when the engine has recognized and located the chosen view, helping the user find and locate an object through Augmented Reality; (c) an "Augmented Search"; a service in which the Viewer module uses image and object recognition to locate defined subjects within the user's/camera's field of view, and curate notes, images, content, documents, and tasks related to the subject. This service provides a "Just-In-Time" intelligent search for the user, without the user having to type anything into a search bar; (d) Model Rendering; a service in which a 3D model can be rendered and displayed to the user. The user may interact with the 3D model by rotating and zooming in/out. If supported by the 3D model, the user may view "Augmented Reality Experiences", or animations that manipulate the model in a 3D space.

In operation, the Credential Dashboard (see Credential screen 310) details a space where the user may view any obtained credentials/micro-credentials (credentials). Credentials may be obtained through the completion of training courses, which may be found in the Content module. Credentials may be written using an OpenBadge® specification, allowing the user to easily carry and display their credentials though any OpenBadge® platform (Backpack).

Upon entering the Credential Dashboard, a list of all credentials the user has earned (i.e., earned credentials 312) is presented to the user. The user may select a credential to view specific information about it (i.e. name, what the credential was given for, when it was issued, when it expires, etc.). The user may additionally toggle to a second tab, detailing what credentials they have made progress towards earning. When selected, a list of all in-progress credentials are presented to the user. The user may select an in-progress credential 314 to view specific information about it (i.e. name, completed requirements, remaining steps to complete and earn the credential, etc.)

Though not directly listed in the diagram, BadgerBot® is a personal virtual assistant that facilitates user usage of IBA®. BadgerBot® is accessed from a menu option from every screen of the app. Backed by Artificial Intelligence (AI), BadgerBot® semantically works to understand what it really is that the user is asking for. BadgerBot® may be used to: (a) navigate to any area of IBA®, (b) control the application; given any view within the app, BadgerBot® is contextually aware of interactable elements on the screen, and can appropriately interact with them though user input, (c) perform sematic searching though natural language processing; given a user inquiry, BadgerBot® uses natural language processing to semantically understand what the user is asking for, and may return appropriate information.

What have been described above are examples. It is, of course, not possible to describe every conceivable combination of components or methodologies for purposes of describing the examples of the disclosure described herein, but one of ordinary skill in the art will recognize that many further combinations and permutations of the examples are possible. Accordingly, the examples described herein are intended to embrace all such alterations, modifications and variations that fall within the scope of the appended claims and the application. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

APPENDIX

The term "Content" is used to describe a generic "openable" or "readable" file. Content will take many forms, but a standard subset includes:
Hyper Text Markup Language (HTML)
Document/Word Processor files (DOC/DOCX)
Presentation/PowerPoint files (PPT/PPTX)
Portable Document Format (PDF)
Joint Photographic Experts Group (JPEG)
Portable Network Graphic (PNG)
Wavefront Object (OBJ)
Digital Assets Exchange Object (DAE)
Visual3D Objet (V3D)
Audio (MP3)
Video (MP4)

What is claimed is:

1. A method of extending capabilities of an existing application to augment learning of a device in training, comprising:
creating on a user device, an authorized session for running a local service application on the user device within an environment of an existing application which runs on a system remote from the user device, wherein the user device includes a biometric authentication system with a blockchain verification system configured to protect user's information and provides tracking of user's information within the authorized session when running the local service application;
displaying on the user device, a home screen menu which is personalized for a user, selection options to launch the local service application to execute within the existing application to provide extended functionalities to the existing application to augment learning of another device in training, wherein the selection options enable the user device to perform one or more task on the another device, comprising:
resuming activities of a recent task previously performed,
updating user's credentials through the training or learning, and
starting a new task on the another device in training or on another new device.

2. The method of claim 1, wherein the updating of user's credentials comprising:
displaying a credential dashboard detailing a space where the user can view any obtained credentials which are obtained through completion or progress of the learning of the another device in training.

3. The method of claim 1, further comprising:
performing natural language processing to semantically understand user's inquiry;
navigating content access from instance storage, and
classifying views or images for recognition to augment search of content from the instance storage.

4. The method of claim 3, wherein the navigating of the content accessed from the instance storage, comprising opening a note template on a screen of the user device to create, edit, delete, view or text search written notes on a new task or a resumed task.

5. The method of claim 3, wherein the navigating of the content accessed from the instance storage, comprising viewing captured images or videos including metadata associated with the captured images or videos from a gallery.

6. The method of claim 5, wherein the metadata associated with the captured images or videos comprises geolocation data, name and model of the another device in training, user's operation instructions.

7. The method of claim 3, wherein the navigating of the content accessed from the instance storage, comprising indexing and re-synchronizing of user's training data into a server, in order that the user is able to toggle to view training-only content or all content and operation history of the name and model of the another device in training.

8. The method of claim 3, wherein the navigating of the content accessed from the instance storage, comprising using an Optical Character Recognition (OCR) engine to read and extract text from a provided image or file, and using a text to speech (TTS) engine to vocalize the extracted text.

9. The method of claim 3, wherein the classifying views or images for recognition, comprising:
capturing images or videos with a camera;
providing zooming and previewing function to render a three dimensional (3D) model to augment the training.

10. The method of claim 9, wherein the user interacts with the rendered 3D model by rotating and zooming in/out to view the 3D model with "Augmented Reality Experiences" or animations that manipulate the 3D model in a 3D space.

11. A non-transitory computer-readable medium storing program codes, when executed by a processor of a user device, configures the user device to perform operations of extending capabilities of an existing application to augment learning of another device in training, the operations comprising:
creating on a user device, an authorized session for running a local service application on the user device within an environment of an existing application which runs on a system remote from the user device, wherein the user device includes a biometric authentication system with a blockchain verification system configured to protect user's information and provides tracking of user's information within the authorized session when running the local service application;
displaying on the user device, a home screen menu which is personalized for a user, selection options to launch the local service application to execute within the existing application to provide extended functionalities to the existing application to augment learning of the another device in training, wherein the selection options enable the user device to perform one or more task on the another device, comprising:
resuming activities of a recent task previously performed,
updating user's credentials through the training or learning, and
starting a new task on the another device in training or on another new device.

12. The non-transitory computer-readable medium of claim 11, wherein the updating of user's credentials comprising:
displaying a credential dashboard detailing a space where the user can view any obtained credentials which are obtained through completion or progress of the learning of the another device in training.

13. The non-transitory computer-readable medium of claim 11, further comprising:
performing natural language processing to semantically understand user's inquiry;
navigating content access from instance storage, and
classifying views or images for recognition to augment search of content from the instance storage.

14. The non-transitory computer-readable medium of claim 13, wherein the navigating of the content accessed from the instance storage, comprising opening a note template on a screen of the user device to create, edit, delete, view or text search written notes on a new task or a resumed task.

15. The non-transitory computer-readable medium of claim 13, wherein the navigating of the content accessed from the instance storage, comprising viewing captured images or videos including metadata associated with the captured images or videos from a gallery.

16. The non-transitory computer-readable medium of claim 15, wherein the metadata associated with the captured images or videos comprises geolocation data, name and model of the another device in training, user's operation instructions.

17. The non-transitory computer-readable medium of claim 13, wherein the navigating of the content accessed from the instance storage, comprising indexing and re-synchronizing of user's training data into a server, in order that the user is able to toggle to view training-only content or all content and operation history of the name and model of the another device in training.

18. The non-transitory computer-readable medium of claim 13, wherein the navigating of the content accessed from the instance storage, comprising using an Optical Character Recognition (OCR) engine to read and extract text from a provided image or file, and using a text to speech (TTS) engine to vocalize the extracted text.

19. The non-transitory computer-readable medium of claim 13, wherein the classifying views or images for recognition, comprising:
capturing images or videos with a camera;
providing zooming and previewing function to render a three dimensional (3D) model to augment the training.

20. The non-transitory computer-readable medium of claim 19, wherein the user interacts with the rendered 3D model by rotating and zooming in/out to view the 3D model with "Augmented Reality Experiences" or animations that manipulate the 3D model in a 3D space.

* * * * *